Oct. 11, 1966 R. J. SMITH 3,278,208
FASTENING DEVICE FOR CABINETS
Filed May 13, 1964
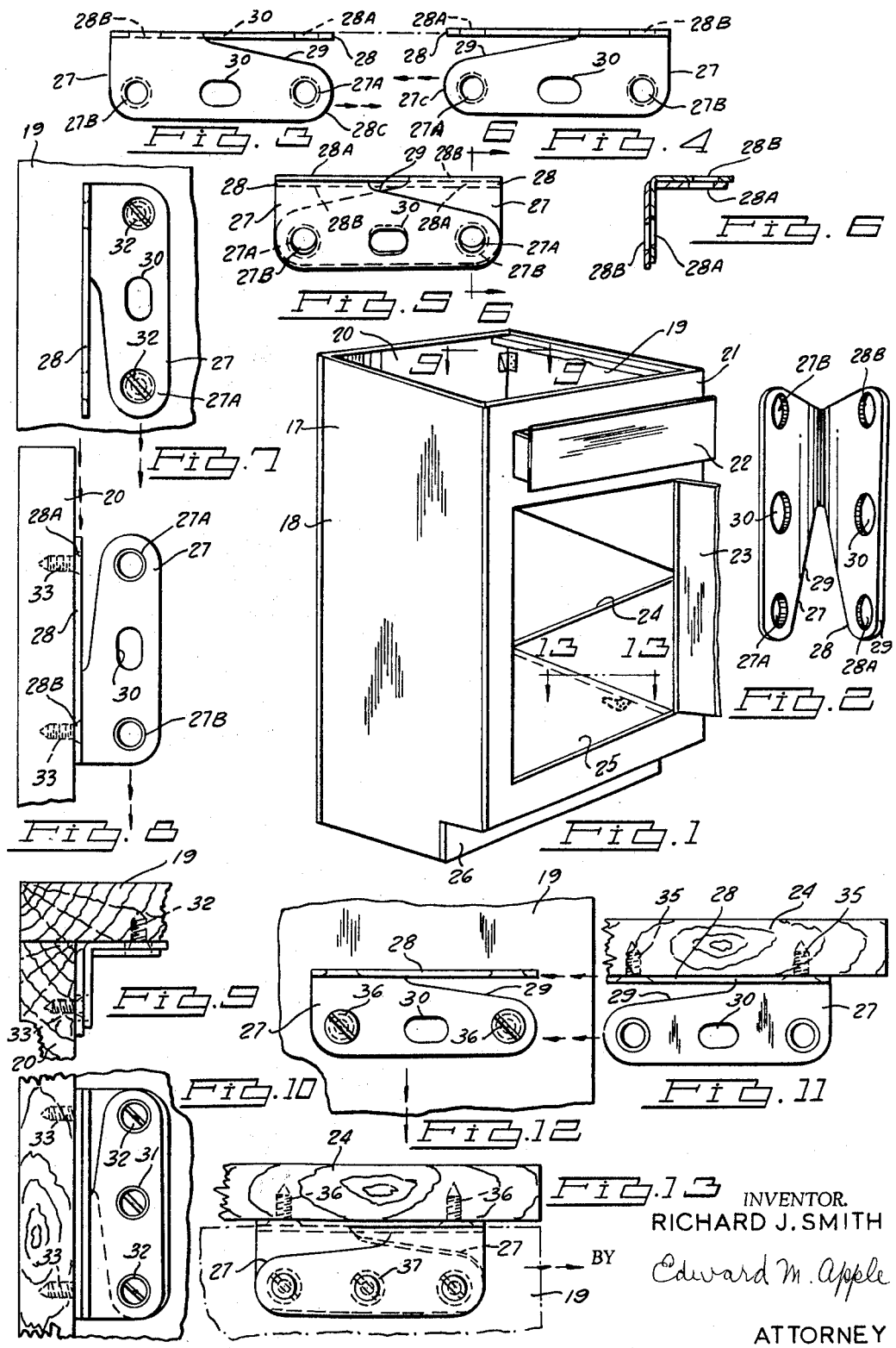
INVENTOR.
RICHARD J. SMITH
BY Edward M. Apple
ATTORNEY United States Patent Office 3,278,208
Patented Oct. 11, 1966

3,278,208
FASTENING DEVICE FOR CABINETS
Richard J. Smith, 28645 Herdonwood, Farmington Township, Mich.
Substituted for abandoned application Ser. No. 121,222, June 30, 1961. This application May 13, 1964, Ser. No. 369,349
3 Claims. (Cl. 287—20.92)

This invention relates to the manufacturing, construction and assembling of kitchen cabinets, and the like, although it may be employed with equal facility in the building of show cases, closets, display booths and many other devices, where it is necessary or desirable to secure a panel, or other member to another member. This application is a substitute for applicant's prior application S.N. 121,222, filed June 30, 1961, and now abandoned.

An object of the invention is to provide a novel means for and method of assembling kitchen cabinets, and the like, so that they may be easily disassembled and transported in knocked-down condition for later assembly on a job.

Another object of the invention is to provide novel means for securing together the panels, shelves, and other elements of a cabinet, so that an ordinary workman, without special tools, may assemble the cabinet on the job in a rapid workman-like manner.

Another object of the invention is to provide novel means on the component parts of a cabinet, so that the parts thereof may be readily assembled in perfectly fitted position, by the simple expedient of the frictional engagement between pairs of the said novel means.

Another object of the invention is to provide a novel plate, which is in the form of a stamping, which may be mated with a similar plate, to secure two parts of a cabinet, box, piece of furniture, or the like, together firmly without the necessity of using glue or nails.

Another object of the invention is to provide a novel right angular fastening means, which is provided with a tapered slot along a portion of the apex of the angle, whereby pairs of the clips may be mated through the slots, to secure the same together.

Another object of the invention is to generally improve panel fastening devices and to provide such a device which is simple in construction, economical to manufacture, and efficient in operation.

The foregoing and other objects and advantages of the invention will become more apparent as the description proceeds, reference being made from time to time to the accompanying drawing, forming part of the within disclosure, in which drawing:

FIG. 1, is a perspective view of a kitchen cabinet, the panels and shelves of which are secured together by means of the novel plate or bracket embodying the invention.

FIG. 2, is a front elevational view of one of the plates or brackets embodying the invention.

FIG. 3, is a side elevational view of the plate shown in FIG. 2.

FIG. 4, is a side elevational view of a plate such as shown in FIG. 3, but turned ninety degrees from the position shown in FIG. 3, and arranged in pre-mating position.

FIG. 5, is a side elevational view showing the plates of FIGS. 3 and 4 in mating relation.

FIG. 6, is a view taken substantially on the line 6—6 of FIG. 5.

FIG. 7, is a fragmentary plan view of a panel having one of the plates shown in FIG. 2 attached thereto, which panel is to be attached in vertical position to a second panel.

FIG. 8, is a fragmentary end view of a second panel having one of the plates shown in FIG. 2 attached thereto, which second panel is to be secured to the panel shown in FIG. 7.

FIG. 9, is a view taken substantially on the line 9—9 of FIG. 1, and illustrates the panels of FIGS. 7 and 8 locked in position by the mating of the plates shown in FIGS. 7 and 8.

FIG. 10, is a fragmentary detail of the underside of the panels and plates shown in FIG. 9.

FIG. 11, is a fragmentary detail showing one of the plates illustrated in FIG. 2, attached to the underside of a shelf which is to be attached to a vertical panel, such as shown in FIG. 12.

FIG. 12, is a fragmentary view of a side panel of a cabinet which is provided with one of the plates shown in FIG. 2, to which panel is to be attached the shelf shown in FIG. 11, by the mating of the two plates shown in FIGS. 11 and 12.

FIG. 13, is a section taken substantially on the line 13—13 of FIG. 1, and shows how the shelf of FIG. 11 is attached to the panel of FIG. 12, by means of the mating of the two plates.

Referring now more particularly to the drawings, it will be understood that in the embodiment herein disclosed, the reference character 17 indicates, in general, a base cabinet for a kitchen which consists of side panels 18 and 19, a rear panel 20, a front panel 21, a drawer 22, a door 23 and shelves 24 and 25 and a kick panel 26, all of which panels and shelves are secured together by means of pairs of mating plates, or brackets, such as illustrated in FIG. 2.

It will be understood that the cabinet, shown in FIG. 1, is illustrative only and that the plates or brackets and method attaching the parts together may be applied to any type of structure in which it is desired to secure together members, either in a vertical position or a horizontal position, or to secure a horizontally positioned member to a vertically positioned member. In the embodiment herein disclosed, the cabinet 17 comprises one of the components of a kitchen cabinet assembly, on the top of which is to be positioned a counter, or the like. It will be understood that the counter (not shown) may be attached to the cabinet 17 in substantially the same manner as illustrated in FIGS. 11–13, inclusive.

It will be understood that the fastening device, or bracket, illustrated in FIG. 2, and used throughout the other views of the drawings, consists of a metal stamping, comprising a plate having legs 27 and 28 which are arranged approximately at a 90 degree angle with reference to one another. Each plate is symmetrical on each side of the apex of the angle. Each leg 27 and 28 has screw holes 27A, 27B, 28A, and 28B. Each plate (FIG. 2) is provided with a tapered cutout portion 29, which bisects the apex of the angle, to a depth of approximately half the length of the plate. The taper on each leg 27 and 28 is the same. The cutout 29 of each plate, or bracket, is arranged to mate with a corresponding cutout of another plate, as hereinafter described.

Each leg 27 and 28 of each plate, or bracket (FIG. 2) is also provided with an elongated slot 30 for receiving screws, or the like, to lock into position pairs of the plates, or brackets, after they have been mated, as shown in FIGS. 9, 10 and 13. Each leg 27 and 28 of the plate shown in FIG. 2 is rounded, as at 27C and 28C (FIGS. 3 and 4), so that the mating of the plates as hereinafter described, may be facilitated.

In FIGS. 3 and 4, I illustrate a pair of the plates, or brackets, arranged in pre-mating position. In order to mate the plate of FIG. 3 with the plate of FIG. 4, the plates must be moved toward each other, as shown by the arrows, so that the cutout portion 29 of each plate will mate with the cutout portion 29 of the other plate, with the result shown in FIG. 5. It will be noted in FIG. 5 that after the plates have been mated, the leg 28A of the plate shown in FIG. 4, overlies the leg 28A of the plate shown in FIG. 3. In this condition, the hole 27A of one plate is in substantial alignment with the hole 27B of the other plate and the hole 28A of one plate is in substantial alignment with the hole 28B of the other plate. When the plates are mated, as shown in FIG. 5, the slots 30 of the adjacent legs of the mating plates are in substantial alignment, so that a screw 31 (FIG. 10) may be extended through the adjacent legs of the mating plates to lock the same in mating position, as shown in FIGS. 9 and 10. It is understood that only one screw 31 is needed to be extended through the adjacent legs of any mating pair of plates, in order to lock them in position and prevent them from being disengaged. In many applications, it is not necessary to use the screw 31 at all, as the tapered edges of the cutouts 29 have sufficient frictional engagement to prevent the plates from being dislodged from one another in normal use after they have been mated. In FIGS. 7 to 13, I illustrated the manner in which pairs of the plates, or brackets, are used to attach one panel to another.

In FIG. 7, I illustrate the manner in which the panel 19 may be attached to the panel 20 by means of a pair of the plates shown in FIG. 2. In the embodiment shown in FIG. 7, it will be noted that the leg 27 of the plate is secured to the panel 19 by means of screws 32, which are preferably countersunk to provide a flush surface, and it will be noted that in the embodiment shown in FIG. 8, the leg 28 of the plate is secured to the panel 20 by means of screws 33 which are also countersunk, so that when the plate of FIG. 7 is moved toward the plate of FIG. 8, the adjacent legs of the plates will lie flush as shown in FIGS. 9 and 10.

In FIG. 11, I illustrate, in detail, how one of the plates is secured to the underside of the shelf 24, which shelf is to be attached to the panel 19 of FIG. 12. In FIG. 11, the leg 28 is secured to the shelf 24 by means of screws 35, which are countersunk to provide a flush surface, and in FIG. 12, the leg 27 of the plate is secured to the panel 19 by means of screws 36 which are also countersunk, so that when the plates of the shelf 24 and the panel 19 are mated, as shown in FIG. 13, the leg 27 of one plate will overlie the leg 27 of the other plate. In this condition, the legs 27 are secured together by means of a screw 37 which extends through the slots 30 of both legs to secure the plates against displacement.

Although I have herein described two methods of using the plates, it will be understood that the plates may be employed in other ways to attach one member to another. For example, the plates may be welded to metal panels in order to secure the metal panels together, instead of wooden panels, as herein disclosed.

It is believed that the operation of the device is obvious from the foregoing description.

Having described my invention, what I claim and desire to secure by Letters Patent is:

1. A fastening device comprising a pair of right angular metal plates, each having a tapered cut out bisecting the apex of the angle, said cut out extending to a depth of approximately half the length of the plate, said plates being symmetrical on each side of the apex, the cut out of one plate being mated with the cut out of the other plate, whereby one leg of each plate overlies one leg of the other plate and one leg of each plate underlies one leg of the other plate, there being holes in each leg of each plate for receiving screws for attaching the respective plates to other elements.

2. The structure of claim 1, including a slot in each leg of each plate which is alignable with a corresponding slot in the adjacent leg of the other plate, the aligned slots of said plates having received therein a screw for holding said plates against displacement from each other.

3. The structure of claim 1, in which each leg of each plate is tapered and terminates in a rounded end, to facilitate the mating of said plates.

References Cited by the Examiner

UNITED STATES PATENTS 764,487 7/1904 Morrison.
2,638,643 5/1953 Olson _____ 20—92

FOREIGN PATENTS 1,179,076 12/1958 France.

HARRISON R. MOSELEY, *Primary Examiner.*

A. I. BREIER, *Assistant Examiner.*